(12) United States Patent
Heintzelman et al.

(10) Patent No.: US 10,946,373 B2
(45) Date of Patent: *Mar. 16, 2021

(54) PIPETTE TIP SYSTEM, DEVICE AND METHOD OF USE

(71) Applicant: Beacon Technologies, LLC, Bear, DE (US)

(72) Inventors: Dale Lee Heintzelman, East Bridgewater, MA (US); John Lloyd Bowman, New Orleans, LA (US); Rick Jackson, Commerce Township, MI (US)

(73) Assignee: Beacon Technologies, LLC, Bear, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/855,219

(22) Filed: Apr. 22, 2020

(65) Prior Publication Data

US 2020/0246790 A1 Aug. 6, 2020

Related U.S. Application Data

(60) Division of application No. 16/031,181, filed on Jul. 10, 2018, now Pat. No. 10,661,268, which is a
(Continued)

(51) Int. Cl.
*G01N 1/10* (2006.01)
*B01L 3/02* (2006.01)
(Continued)

(52) U.S. Cl.
CPC .............. *B01L 3/0275* (2013.01); *B01L 3/021* (2013.01); *B01L 9/543* (2013.01); *G01N 1/14* (2013.01);
(Continued)

(58) Field of Classification Search
CPC .... G01N 21/05; G01N 21/03; G01N 21/0303; G01N 30/74; G01N 21/031
(Continued)

(56) References Cited

U.S. PATENT DOCUMENTS 8,233,146 B2 7/2012 Chen
8,332,960 B2 12/2012 Schäffer et al.
(Continued)

*Primary Examiner* — Md M Rahman
(74) *Attorney, Agent, or Firm* — Susan B. Fentresi; Veritay Group, IP

(57) ABSTRACT

This disclosure is directed to exemplary embodiments of systems, methods, techniques, processes, products and product components that can facilitate users making improved absorbance or fluorescence measurements in the field of spectroscopy with reduced (minimal) sample waste, and increased throughput, particularly in the study of biological sciences. A method and device for photometric measurement of liquids. The method includes the steps of: The method includes the steps of; providing a pipette tip, the pipette tip being made of an optically clear body having an outer wall and an inner wall, the inner wall defining an inner space for receiving a liquid sample, the inner space providing a cross-sectional path length for light; positioning the pipette tip between a light source and a light collector; measuring light transmission through the liquid sample; adjusting the inner space of the pipette tip to change the cross-sectional length, and measuring light transmission through the liquid sample. This can be accomplished by moving the light source from a first position to at least a second position to provide a plurality of cross-sectional path lengths through the liquid sample or by moving the pipette tip from a first position to at least a second position to provide a plurality of cross-sectional path lengths through the liquid sample.

3 Claims, 8 Drawing Sheets

Related U.S. Application Data continuation-in-part of application No. 15/472,327, filed on Mar. 29, 2017, now Pat. No. 10,092,899, which is a division of application No. 15/112,792, filed as application No. PCT/US2015/038517 on Jun. 30, 2015, now Pat. No. 9,638,608.

(60) Provisional application No. 62/019,378, filed on Jun. 30, 2014.

(51) Int. Cl.
| | |
|---|---|
| *G01N 21/01* | (2006.01) |
| *G01N 21/59* | (2006.01) |
| *G01N 21/03* | (2006.01) |
| *B01L 9/00* | (2006.01) |
| *G01N 1/14* | (2006.01) |
| *G01N 35/10* | (2006.01) |
| *G01N 21/13* | (2006.01) |

(52) U.S. Cl.
CPC ............. *G01N 21/01* (2013.01); *G01N 21/03* (2013.01); *G01N 21/031* (2013.01); *G01N 21/0303* (2013.01); *G01N 21/59* (2013.01); *G01N 35/10* (2013.01); *B01L 2200/025* (2013.01); *B01L 2200/026* (2013.01); *B01L 2300/0654* (2013.01); *B01L 2300/0858* (2013.01); *B01L 2300/123* (2013.01); *B01L 2300/168* (2013.01); *G01N 21/13* (2013.01); *G01N 2021/0367* (2013.01); *G01N 2035/1062* (2013.01); *G01N 2201/0662* (2013.01)

(58) Field of Classification Search
USPC ........................................................ 356/246
See application file for complete search history.

(56) References Cited

U.S. PATENT DOCUMENTS

| | | |
|---|---|---|
| 2004/0033610 A1 | 2/2004 | Lovell et al. |
| 2007/0003443 A1 | 1/2007 | Sandell et al. |
| 2007/0231214 A1 | 10/2007 | Sakaguchi |
| 2011/0317146 A1 | 12/2011 | Gu et al. |
| 2012/0224179 A1 | 9/2012 | Page |
| 2012/0270310 A1 | 10/2012 | Spence et al. |

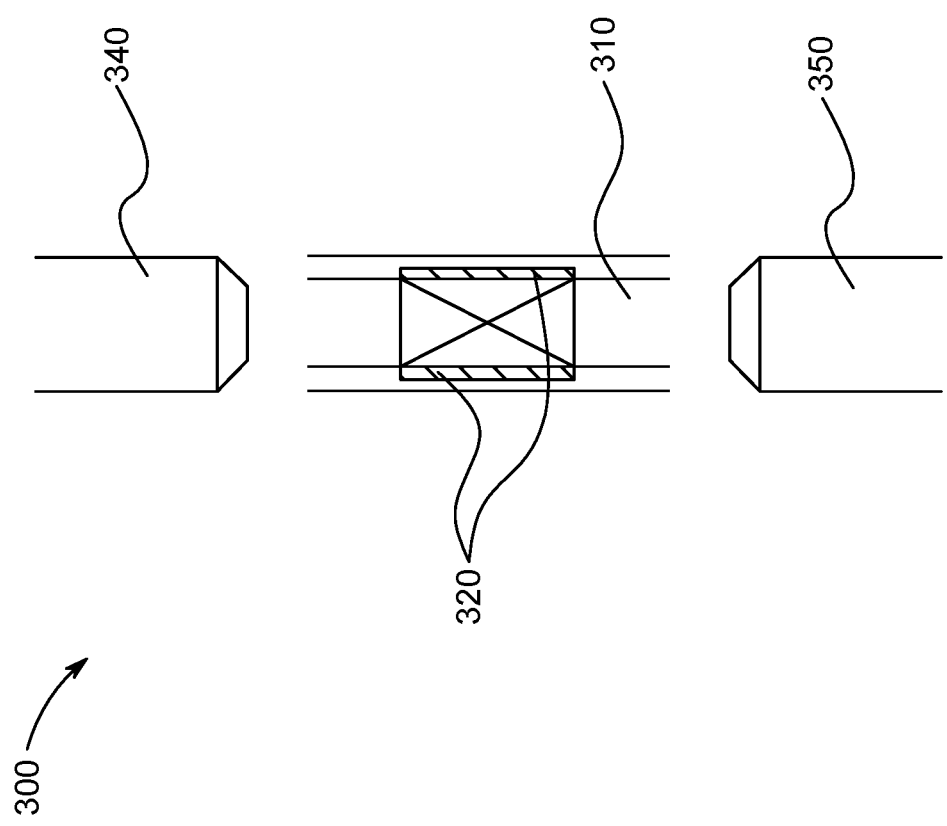

PIPETTE TIP SYSTEM, DEVICE AND METHOD OF USE

RELATED APPLICATIONS

This application is a divisional application of U.S. Ser. No. 16/031,181 filed Jul. 10, 2018 and a continuation-in part of U.S. patent application Ser. No. 15/472,327 filed Mar. 29, 2017, which is a divisional of U.S. patent application Ser. No. 15/112,792 filed Jul. 20, 2016, which is a § 371 National Stage Application of PCT/US15/038517 application filed 30 Jun. 2015 and U.S. provisional patent application Ser. No. 62/019,378 filed 30 Jun. 2014, under 35 U.S.C. § 111(a) (hereby specifically incorporated herein by reference).

TECHNICAL FIELD

This disclosure is directed to exemplary embodiments of systems, methods, techniques, processes, products and product components that can facilitate users making improved absorbance or fluorescence measurements in the field of spectroscopy with reduced (minimal) sample waste, and increased throughput, particularly in the study of biological sciences, with an objective, among others, of providing a unique, efficient solution to accurate absorbance/fluorescence measurements of liquid samples, and a reduction in equipment maintenance requirements.

BACKGROUND OF THE INVENTION

This disclosure is directed to exemplary embodiments of systems, methods, techniques, processes, products and product components that can facilitate users making improved absorbance or fluorescence measurements in the field of spectroscopy with reduced (minimal) sample waste, and increased throughput, particularly in the study of biological sciences, with an objective, among others, of providing a unique, efficient solution to accurate absorbance/fluorescence measurements of liquid samples, and a reduction in equipment maintenance requirements.

DESCRIPTION OF THE RELATED ART

Conventionally, there are two principal methods, techniques or processes by which liquid samples are measured and analyzed. The first conventional method involves use of a cuvette. A cuvette is a small tube generally of circular or square cross section, sealed at one end, and formed of a plastic material, glass, or fused quartz (for implementations that can involve the use of ultra-violet (UV) light). Cuvettes are designed to hold samples for spectroscopic experiments and analyses. Cuvettes are formed to have cross-sectional lengths, often 10 mm across, to allow for easy calculations of levels of illumination and/or coefficients of absorption. Cuvettes are filled with liquid samples and light from a light source is shone through the liquid samples, the light from the light source often being specifically regulated through a series of intervening optics structures on a light supplying or incident side of the cuvette and correspondingly on a light collecting or recovery side of the cuvette. The involved optical elements can include, for example, integrating spheres, an intention of which is to normalize the light passed through the liquid sample from the light supplying components and recovered by light collecting components. The collected light, having passed through the liquid sample, is then passed generally to a spectrometer to evaluate absorption of the light by the liquid sample, i.e., intensity of the collected light at various wavelengths. Cuvettes are generally not considered to be disposable items and, therefore, must be thoroughly washed between sample measurements to avoid contaminating the sample measurements. Further, cuvettes, and the processing of liquid sample measurements using those cuvettes, tend to waste a significant amount of a liquid sample.

The second method involves the spectroscopic measuring of liquid samples via a process by which microliter volume liquid samples are held by surface tension between two structural (anvil) surfaces. The anvil surfaces are highly polished, and generally include embedded optical fibers with ends finished flush with the anvil surfaces. Generally, one of the anvils is fixed, and the other of the anvils is movable to precisely control a distance between the anvils over which the absorption of the light by the liquid sample can be measured. U.S. Pat. No. 7,397,036 to Robertson et al., issued Jul. 8, 2008, describes such an exemplary measurement apparatus and method. A liquid sample is deposited on a small pedestal. The deposited liquid sample is then engaged by the anvils and essentially stretched as a liquid column supported between the anvil surfaces by surface tension in the liquid sample. This method, which still requires contact of elements of the measuring device with the liquid sample, also requires specific cleaning of the device surfaces between sample measurements to avoid contaminating subsequent liquid samples leading to potentially erroneous measurements. This cleaning must be carefully undertaken to not affect the cleaned and polished nature of the anvils and embedded optical elements in a manner that can adversely affect liquid sample adherence retention, and/or the optical analysis.

SUMMARY OF THE INVENTION

As will be described in specific detail below, the disclosed embodiments are directed to a unique pipette tip product that can address certain of the shortfalls in the conventional systems described above according to one or more of the following functional objectives. The inventive subject matter is: a method for photometric measurement of liquids. The method includes the steps of: providing a pipette tip, the pipette tip being made of an optically clear body having an outer wall and an inner wall, the inner wall defining an inner space for receiving a liquid sample, the inner space providing a cross-sectional path length for light; positioning the pipette tip between a light source and a light collector; measuring light transmission through the liquid sample; adjusting the inner space of the pipette tip to change the cross-sectional path length for light, and measuring light transmission through the liquid sample. This can be accomplished by moving the light source from a first position to at least a second position to provide a plurality of cross-sectional path lengths through the liquid sample or by moving the pipette tip from a first position to at least a second position to provide a plurality of cross-sectional path lengths through the liquid sample.

The inventive subject matter further includes: a device for photometric measurement of liquids made of: an optically clear body having an outer wall and an inner wall, the inner wall defining an inner space for receiving a liquid sample; the inner space having a surface shape to provide a cross-sectional path for light, wherein a portion of the inner space is comprised of a plurality of optically clear tubes of differing inner diameter, each of the plurality of optically clear tubes providing a cross-sectional path of different lengths.

The inventive subject matter further includes a device for photometric measurement of liquids made of: an optically clear body having an outer wall and an inner wall, the inner wall defining an inner space for receiving a liquid sample; the inner space having a surface shape to provide a cross-sectional pathlength for light, wherein a portion of the inner space is made of a first inner surface and a second inner surface, wherein the first inner surface and the second inner surface are non-parallel with respect to each other to provide the cross-sectional path length for light.

The inventive subject matter further includes a device for photometric measurement of liquids. The device being made of: an optically clear body having an outer wall and an inner wall, the inner wall defining an inner space for receiving a liquid sample; the inner space having a reflective surface which reflects a wavelength of light to provide an effective path length in which the reflective surface is either the inner or the outer wall.

BRIEF DESCRIPTION OF THE DRAWINGS

The invention can be best understood by those having ordinary skill in the art by reference to the following detailed description when considered in conjunction with the accompanying drawings in which:

FIG. 3A illustrates a view of an exemplary embodiment reflective surfaces within the pipette tip and FIG. 3B illustrates a view of an exemplary embodiment reflective surfaces within the pipette tip.

DETAILED DESCRIPTION OF INVENTION

Figure 1:
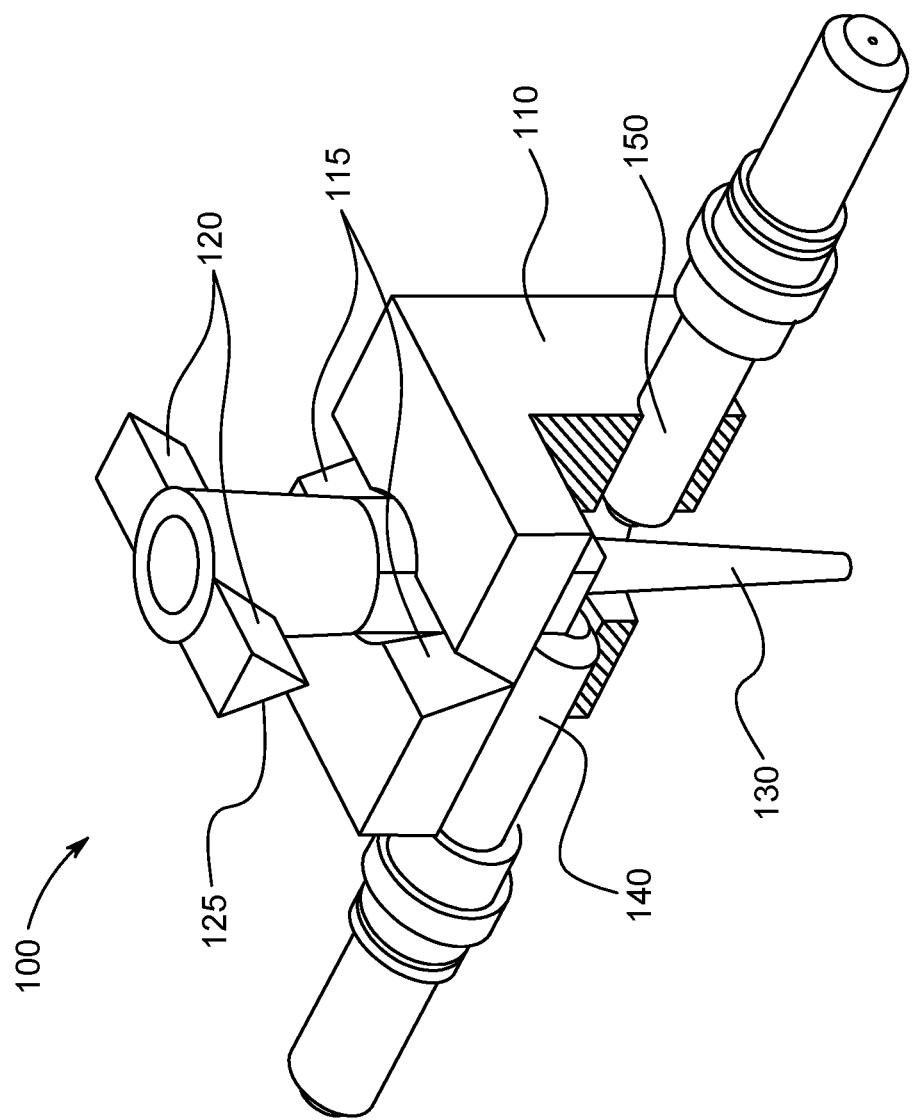
FIG. 1 illustrates a cross-sectional view of an exemplary embodiment of the measuring system structure.

Exemplary embodiments of the systems and methods according to this disclosure can provide a unique pipette tip product for implementing the quantifying of concentrations of solid components in solution in liquid samples. In embodiments, the solid components can include biological specimens such as, for example, proteins and nucleic acids, in the liquid samples. Exemplary embodiments can provide for a pipette having a tip, the pipette configured to aspirate a fluid sample and hold the fluid sample within the tip, a pipette tip being inserted into a measurement system, the measuring system preferably having features for locating, and positioning the pipette tip appropriately to support the analysis of the liquid sample. In embodiments, the pipette tip can have, or be arranged to have, a cross sectional length in a light traversing direction to facilitate a spectroscopic analysis of the liquid sample in the pipette tip across the cross-sectional length. A pipette tip has a generally tubular or truncated cone shape with inner and outer walls, and an inner space for receiving a liquid sample. A portion of the inner space can be shaped to change the optical properties of the pipette tip. The portion of the inner space that is modified is the shape or size of the inner walls. The optical area is the area through which light passes.

In embodiments, the pipette tip can be held by any part of the tip or pipette in the measurement system structure, appropriately positioned between the measurement mechanics of the structure. In embodiments, the pipette tip can be ejected from, or remain connected to, the pipette when the pipette tip is properly positioned between the measurement mechanics of the measurement system structure. In embodiments, the pipette tip can be an integrated part of a transfer, bulb, or other single piece liquid collecting apparatus.

Exemplary embodiments can provide a specifically-cooperating light source with optics included for generating and projecting light onto an incident side of the pipette tip, and through the liquid sample, for collection on a recovery side of the pipette tip by light collecting elements. In embodiments, the light source can comprise one or more of a deuterium flash, a xenon flash lamp, a light emitting diode (LED), or other appropriate like light source. The light source can generally supply generated light to one or more of a fiber optics cable, a light pipe, or other light carrying/conveying medium. Combinations of these features can be generally referred to throughout this disclosure as a light source. Exemplary embodiments can provide that the light emitted by the light source can be made to pass through the disclosed pipette tip containing the liquid sample, and to be collected by a light collector. The light collector can be made of one or more of a second fiber optics cable, light pipe, or other light carrying/conveying medium. In embodiments, one or both light source and the light collector a further includes certain optics adjustment components, including, but not limited to, one or more lenses, mirrors, windows, and/or filters between the light source and the pipette tip and/or between the pipette tip and the light collecting unit. In embodiments, the light source and the light collector can be made of multiple cooperating output ports and input ports, respectively. These multiple numbers of cooperating output ports and input ports can be generally arranged in a structure commonly referred to as a multiplexer. In embodiments, the light source and the light collector can be one or both movable by means of manual or automatic operation with respect to each other in order that the one or both light source and the light collector can be movable closer to, or farther away from, the disclosed pipette tip, which can or cannot be used for positioning the pipette tip and/or optics. In embodiments, the pipette tip and/or pipette can be movable by means of manual or automatic operation to align the measurement area with the light supplying/collecting units.

Exemplary embodiments can provide that the light collector passes collected light, having traversed through the liquid sample in the pipette tip, to a spectrometer or similar detector for light intensity/absorption measurements. Resulting measurements can be related, via, for example, a processing device, to one or more reference values that can be usable to calculate a concentration of the liquid sample according to known means and techniques. Exemplary embodiments can provide a capacity to recover the pipette tip with the liquid sample inside allowing for no cross contamination of liquid samples, realizing minimal (essentially no) sample loss due to measurement, and substantially obviating any requirement to clean sample measurement surfaces between sample measurements, i.e., significantly reducing time-consuming maintenance requirements between sample measurements.

Now referring to FIG. 1, an exemplary embodiment is provided of a measuring system 100 made of a base unit 110 within which a pipette tip 130 can be inserted with the objective of measuring light transmission in a repeatable manner. The base unit 110 provides a means to make the measurements using at least one light source 140 positioned to supply light to a liquid sample in the pipette tip 130 and at least one light collector 150 positioned to collect light from a liquid sample in the pipette tip 130. The exemplary measuring system structure 100 can include, for example, a base unit 110 and a component unit 120. The component unit 120 is configured to secure a pipette tip 130. To secure in this context means that the component unit 120 can be removable or an integrated part of the pipette tip 130.

The component unit 120, if removable, can be specifically configured to secure the pipette tip 130. The pipette tip 130 can be secured by any conventional means to the component unit 120, if removable. The pipette tip 130 can be secured to component unit 120, if removable, for example, by a snap fit, friction fit, or any other similar mechanical means of joining two parts together in a non-permanent manner. Alternatively, the component unit 120 can be permanently secured to the pipette tip 130 during the manufacturing process.

An outer profile 125 of the component unit 120 can be configured to physically interact with an inner profile 115 of an accommodating space in the base unit 110. This physical interaction between the outer profile 125 of the component unit 120 and the inner profile 115 of the base unit 110 can provide controlled structural alignment of the pipette tip 130 between a light source 140 and a light collector 150 fixedly or movably mounted in the base unit 110.

An advantage of the illustrated and described physical interaction between the outer profile 125 of the component unit 120 and the inner profile 115 of the base unit is that it provides an essentially self-aligning structure for repeatable positioning of the pipette tip 130 that substantially obviates a requirement, such as can be required in the conventional microliter volume drop method discussed above, for the user to be exceptionally precise in guiding the pipette tip 130 to a particular pedestal on which the sample volume drop can be deposited.

Another advantage of the exemplary physical embodiments according to this disclosure is that they further remove a requirement for ejecting the liquid sample material from the pipette tip, thereby further obviating the attendant requirement to clean surfaces within, for example, the accommodating space in the base unit 110, or any of the associated structural components of the exemplary measuring system structure 100, as depicted. In other words, the liquid sample need never touch any of the surfaces of the structure but can, in all instances, remain substantially within the pipette tip 130.

Generally, the disclosed pipette tip 130 is a liquid collecting tip for a pipette that fits onto the pipette. In embodiments, the pipette tip 130 can be attached to, and/or removable from, the pipette. The attachment to the pipette tip 130 can be accomplished using standard methods including, for example, a snap or press fit to the pipette. More broadly, the pipette tip 130 can be held in place by means of physical pressure, magnetism, gravity, suction, or any similar method upon a surface of the pipette tip 130 or the pipette body itself. When removable/detachable from the pipette, the pipette tip 130 can be a disposable component. Otherwise, when removable/detachable from the pipette, the pipette tip 130 can be a cleanable and reusable component. The pipette tip 130 can be formed of any geometry to substantially prevent loss of the liquid sample if ejected from the pipette. The pipette tip 130 can be formed of an optically clear material. The pipette tip 130 can have applied to it appropriate light transmittance zones or features in one or multiple areas for light to pass through with minimal interruption.

Figure 2:
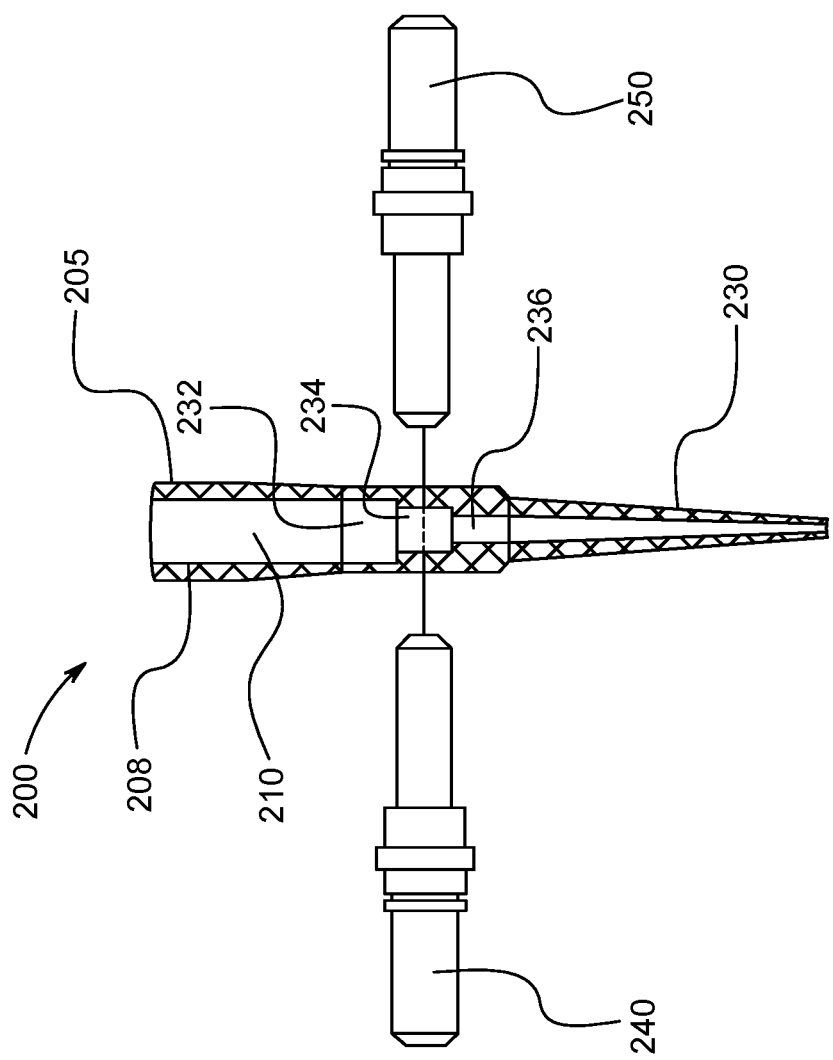
FIG. 2 illustrates a side view of an embodiment of a pipette tip for photometric measurement of liquids.

FIG. 2 illustrates an exemplary embodiment 200 for an exemplary pipette tip 230 according to this disclosure. As shown in FIG. 2, the pipette tip 230 is made of an outer wall 205 and an inner wall 208. The inner wall 208 defines an inner space 210 for receiving a liquid sample. The inner space of the pipette tip can be adjusted to change the cross-sectional length and thus the optical properties. For example, the inner space 210 of the exemplary pipette tip 230 can be formed, or otherwise configured, to have a plurality of optically clear tubes of differing inner diameter, thus providing different cross-sectional path lengths. These stacked tube segments 232, 234 and 236 can be made of quartz, sapphire, plastic, glass, ceramics, or any like material capable of passing the desired wavelength of light. The stacked tube segments 232, 234 and 236 can be sized to accommodate a range of concentration levels. Larger diameters allow for lower concentration detection, and smaller diameters allow for higher concentration detection. Path length is defined by the ID of each of the stacked tube segments 232, 234 and 236. The stacked tube segments 232, 234 and 236 can be made of a single machined piece or an assembly of multiple parts. Multiple part assembly can be connected by means of optical cement, chemically compatible adhesive, mechanical means (press fit, clamp, etc.), or any other method of coupling tubing. The optical area of the stacked tube segments 232, 234 and 236 can be polished for increased clarity. The symmetry of the stacked tube segments 232, 234 and 236 negates the necessity of pipette tip 230 orientation. Because of symmetry, the area of the tube that light enters, and exits is not dependent upon the rotational position of the tip about its central axis. The light will behave similarly when entering and exiting the tube independent of rotation of the tip. The tip can be aligned with the light supplying and collecting entities via a v-groove piece or similar method of gripping the OD of one or more of the tubes. In operation, light enters the sample contained in a stacked tube segment 232, 234 and 236 via one or more light source 240. In this embodiment, one or more light source 240, can be stationary or movable. The light source 240 can move towards or away from the pipette tip 230 to make clearance for the pipette tip 230 to be inserted and grip the pipette tip 230 for orientation. The light source 240 can moved on a bearing surface (not shown) and can be actuated by a motor (not shown). The light is collected via one or more light collectors 250 after traveling through the liquid sample by means of optics not shown) if necessary for analysis. The light may need to be directed, after exiting the pipette tip 230, with the help of optics (not shown) such as a ball lens into the light collecting entity for analysis. Light collectors 250 can be stationary or movable. The light collectors 250 can move towards or away from the pipette tip 230 to make clearance for the pipette tip 240 to be inserted and grip the pipette tip 230 for orientation.

Figure 3A:
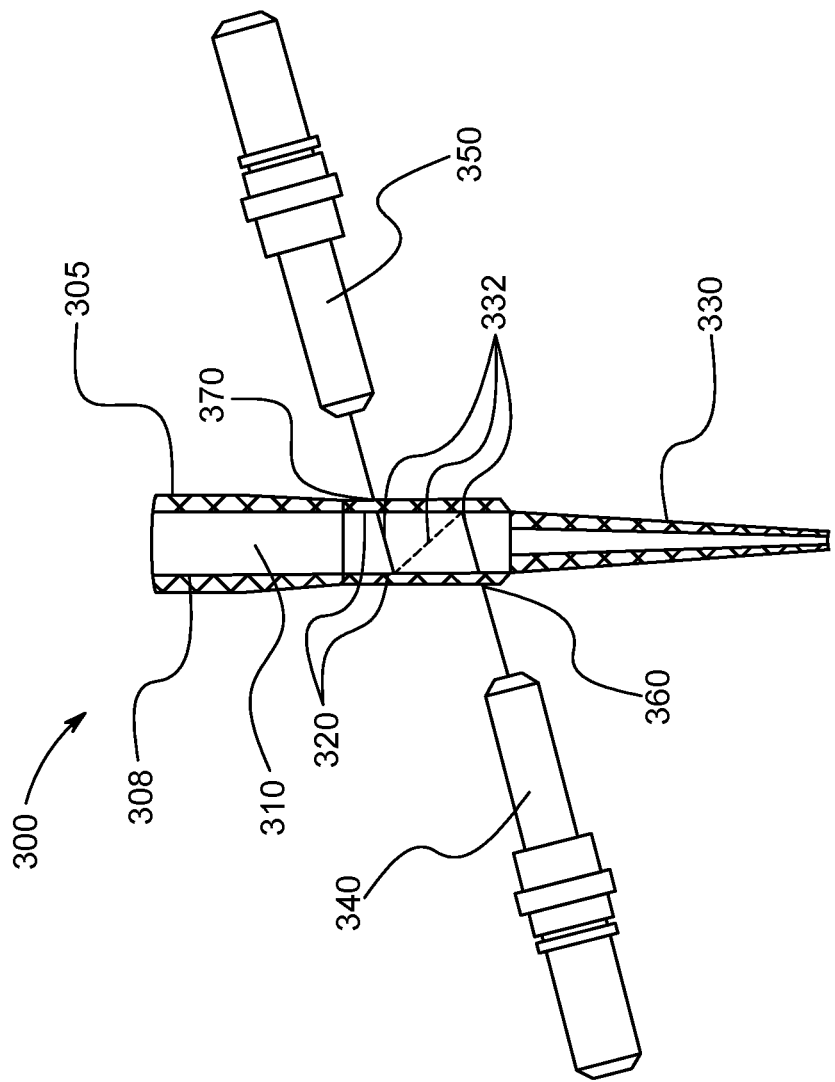

Now referring to FIG. 3A, the pipette tip 330 is made of an outer wall 305 and an inner wall 308. The inner wall 308 defines an inner space 310 for receiving a liquid sample. The inner space 310 of the exemplary pipette tip 330 can be formed, or otherwise configured with reflective surfaces that provide variable cross-sectional path lengths. For example, long cross-sectional path lengths allow low concentration detection limits.

The reflective surfaces 320 are created by the inherent nature of the material, a coating method (dipped, thin film deposition, etc.), and/or optical manipulation (total internal refraction, fiber Bragg grating, etc.) The pipette tip 330 can include flat, angled, curved, or complex geometry surfaces to manipulate the cross-sectional light path. The cross-sectional path length 332 through the liquid sample is determined by the trajectory of the supplied light. The effective cross-sectional path length 332 is the cumulative lengths of the reflected light. The light can be supplied at any angle from any direction by a light source 340.

A section of the inner wall 308 and outer wall 305 form a window port 360 capable of passing a desired wavelength(s) of light in this embodiment. The port 360 can be an optical filter. Next light enters the pipette tip 330 through a window port 360 and is reflected any number of times through a liquid sample inside. Window ports 360, 370 can be plastic, quartz, sapphire, or any material capable of passing the desired wavelength(s) of light. Window ports 360 and 370 are not required to have reflective properties. The light is collected after traveling through the liquid sample by a light collector 350 and optics (not shown) if necessary for analysis. Light exits the pipette tip 330 via a window port a window port 370.

Now referring to FIG. 3B, the reflective surfaces 320 is for example a fiber Bragg grating. A fiber is manufactured to have a hollow core. The walls of the fiber contain a grating which reflects wavelengths of light. The fiber portion of the pipette tip may be drawn over a mandrel to create a cavity within the fiber or any other appropriate manufacturing technique. The cavity has the capacity to hold liquid or gas samples. A fiber Bragg grating is created during the manufacturing process for the reflection of one or more wavelengths of light. Light is supplied to the pipette tip 300 and reflects at the specified wavelengths. The light can be supplied at any angle from any direction by a light source 340. The reflected light or passed light may be collected by a light collector 350 oriented parallel or perpendicular to the axis of the tip. The light source 340 may be the same entity as the light collector 350 in this instance depending upon the nature of the reflections. The light collected may be analyzed by means of a spectrometer or similar device (not shown).

Figure 4:
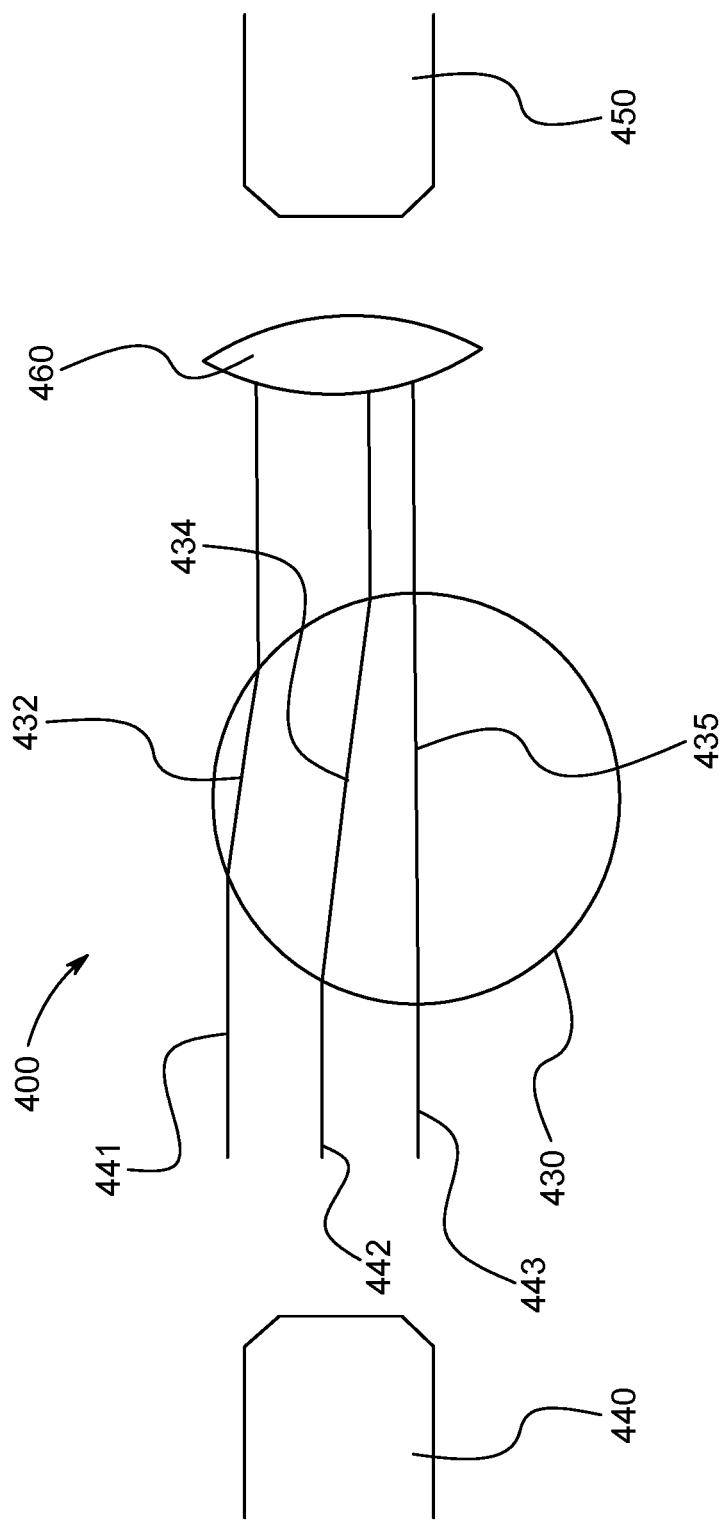
FIG. 4 illustrates an exemplary embodiment of a variable light source.

Now referring to FIG. 4, an exemplary embodiment 400 for an exemplary pipette tip 430 according to this disclosure is illustrated with a variable light source. In this embodiment, the surfaces of the pipette tip 430 geometry are designed to accept light of varying positions and/or angles of origin. Outside and/or inside the pipette 430 tip can reflect or refract light to control cross-sectional path length by changing the angle or location of light entry into the pipette tip 430. A circular cross section is shown in FIG. 4, although the cross section may be flat, angled, curved, or of complex geometry dictated by desired cross-sectional path length range, tip materials, and tip manufacturing methods. In this embodiment, a light source 440 is movable. Three positions, 441, 442, and 443, of a single light source are shown in FIG. 4. The light source can be movable by for example an actuating motor and bearing sub-system (not shown). The cross-sectional path length 432, 434, 435 through a liquid sample changes depending upon the position, 441, 442, and 443, of the light source. The light source is moved from a first position to at least a second position to provide a plurality of cross-sectional path lengths for light through the liquid sample. The pipette tip 430 geometry can include flat, angled, curved, or complex geometry surfaces to manipulate light cross-sectional path length 432, 434, 435. The light is collected after traveling through the liquid sample by using optics 460 if necessary for analysis. The light can be directed, after exiting the pipette tip 430, with the help of optics 460 such as a ball lens into the light collector 450 for analysis. The light collector 450 can be fixed or movable.

Figure 5:
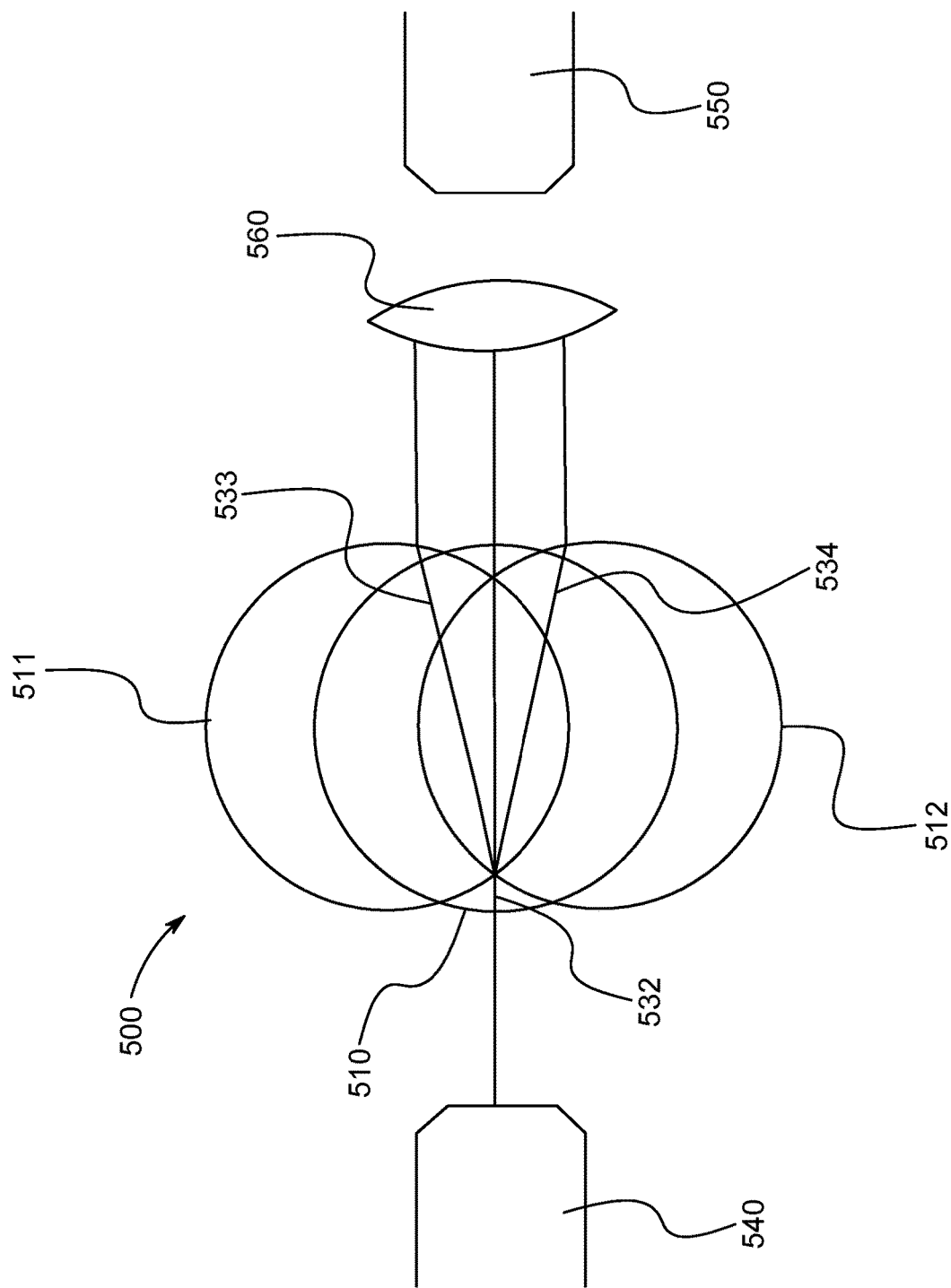
FIG. 5 depicts the top view of a tip with a circular cross section in three positions.

Now referring to FIG. 5 an exemplary embodiment 500 for an exemplary pipette tip according to this disclosure is illustrated with a fixed light source. In this exemplary embodiment, a variable pipette tip position is shown. FIG. 5 depicts the top view of a pipette tip with a circular cross section in three positions 510, 511, and 512. The pipette tip is moved from a first position 510 to at least a second position 511 and or 512 to provide a plurality of cross-sectional path lengths through the liquid sample. The pipette tip's position is relative to the location to the light source 540. A fixed light source 540 emits light that passes light through a liquid sample contained in a movable pipette tip, 510, 511, and 512. The pipette tip can be moved by use of a motor for actuation, and bearings (not shown) to provide repeatability of position. The geometry of the pipette tip dictates cross-sectional path length of the light through the liquid sample as the pipette tip moves. The pipette tip includes flat, angled, or curved sections to create the desired path length. The pipette tip can be moved to position 510, 511, and 512. The movement of the tip position changes the cross-sectional path length 532, 533, 534. The light is collected via a light collector 550 after traveling through the liquid sample by means of optics 560 if necessary for analysis. The light collector 550 can be fixed or movable.

Figure 6:
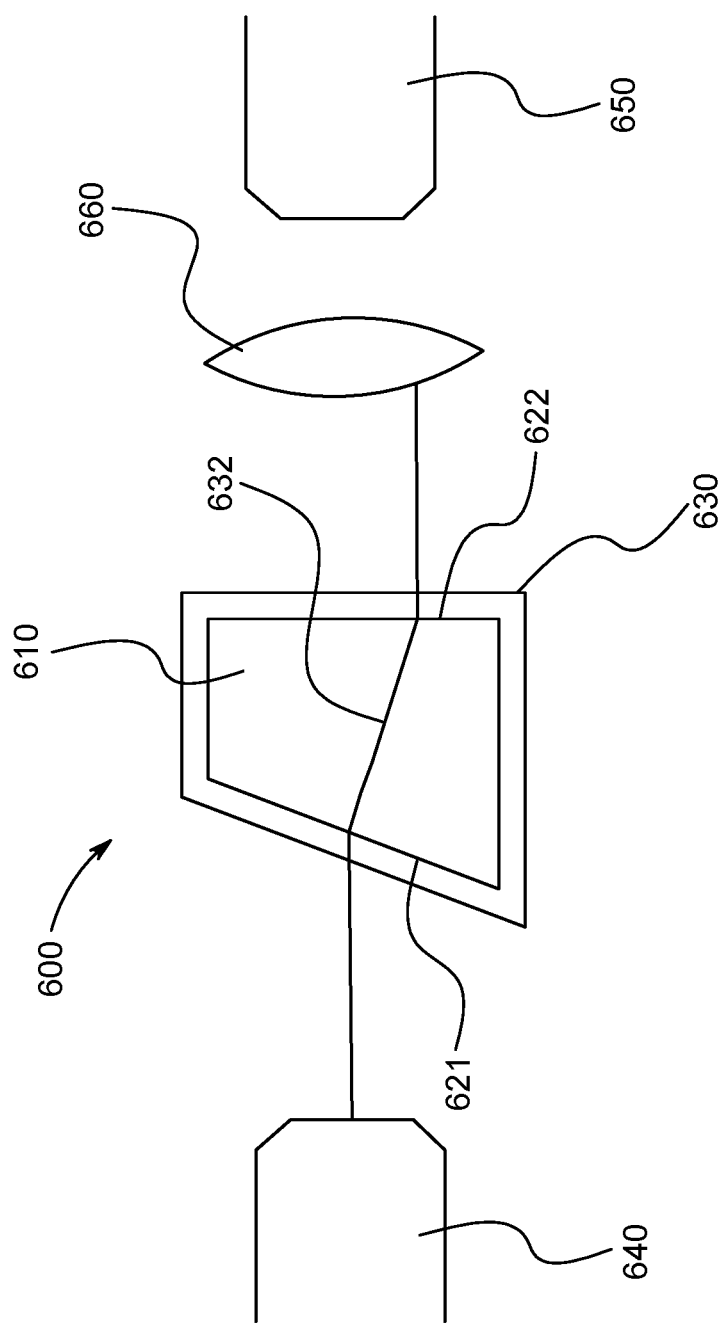
FIG. 6 illustrates an embodiment of a pipette tip for photometric measurement of liquids.

Now referring to FIG. 6, an exemplary embodiment 600 for an exemplary pipette tip 630 according to this disclosure is illustrated with a light source 640 that may be fixed or movable. The light source can be movable by for example an actuating motor and bearing sub-system (not shown). In this exemplary embodiment, non-parallel inner tip surfaces are provided. A light source 640 provides light to a liquid sample 610 contained in a pipette tip 630. The distance between the inner surfaces 621, and 622 of pipette tip 630 create a cross-sectional path length 632 of light through the sample 610. The inner surfaces 621, and 622 of the pipette tip 630 can be at any orientation relative to each other. The inner surfaces 621, and 622 of the pipette tip 630 may be of a flat, curved, or of complex shape. The inner surfaces 621, and 622 of the pipette tip 630 can be plastic, quartz, sapphire, or any material capable of passing the desired wavelength(s) of light. Light is collected via a light collector 650 after passing through the pipette tip 630 Optics 660 may be utilized to guide the light to the light collector 650.

Figure 7:
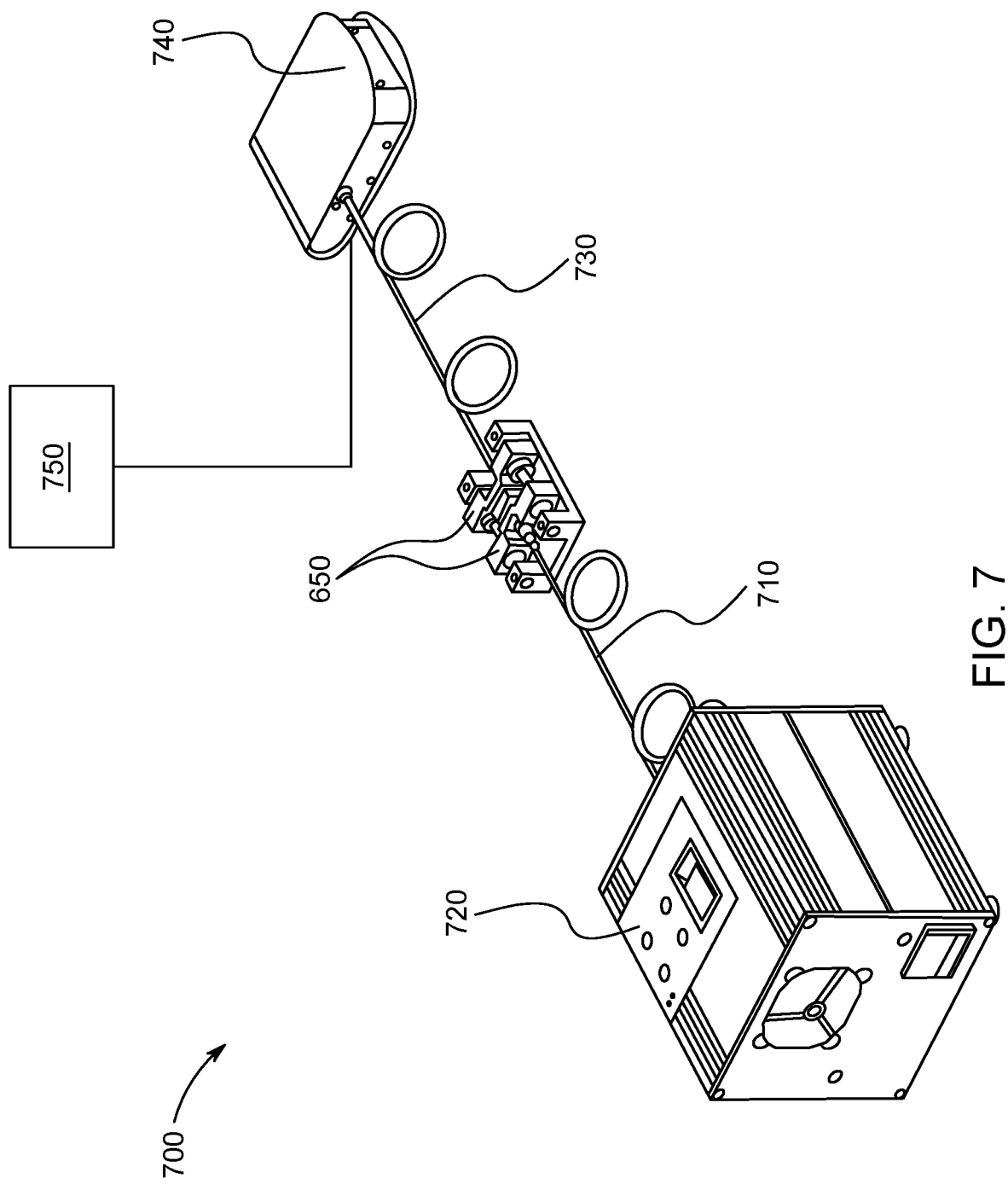
FIG. 7 illustrates a view of an exemplary embodiment of an exploded isometric view of a system.

Now referring to FIG. 7 a system 700 that was created by connecting a fiber optics cable with quartz core 710 to a light source 720 on one end, and to one of the threaded fiber bushings 650 on the other end is illustrated. A second fiber optics cable 730 having a quartz core larger than 710 was connected to the remaining threaded fiber bushing 650 on one end, and to a spectrometer 740 on the other end. The spectrometer 740 fed into a personal computer 750 with software appropriate for graphical interpretation of the spectrometer's 740 signal to measure light intensity.

The cartridge 500 was placed approximately in the center between the two bearing blocks 620 with minimal support by a loose-fitting slot machined into base plate 610. The bearing blocks 620 were moved along the linear bearings 630 to allow the lips 660 to meet the quartz discs 520. This interaction aligned the fiber optics cables 710 and 730 perpendicular with the quartz discs 520. Measurements of light intensity were taken from this configuration. Measurements were taken with air between the quartz discs 520 in cartridge 500, and water for comparison. Between every measurement the cartridge 500 was removed from the base 600 and replaced to create non-repeating starting locations of the cartridge 500 for each measurement. The results of these measurements can be seen in TABLE 1.

TABLE 1

| Air at 701.2936 nm | | Water at 701.2936 nm | |
|---|---|---|---|
| Measurement | Intensity | Measurement | Intensity |
| 1 | 0.71867 | 1 | 0.89449 |
| 2 | 0.72413 | 2 | 0.89707 |
| 3 | 0.72577 | 3 | 0.90385 |
| 4 | 0.73195 | 4 | 0.90395 |
| 5 | 0.73655 | 5 | 0.91473 |
| STDEV | 0.006964 | STDEV | 0.007852 |
| Max | 0.73655 | Max | 0.91473 |
| Min | 0.71867 | Min | 0.89449 |
| Range | 0.01788 | Range | 0.02024 |

The results in TABLE 1 correspond to respective linear regression lines with R-squared values greater than 0.9 each. A person familiar with this value will recognize there is a clear linear trend. Using personal computer 750 intensity values integrated over time would yield precise intensity measurements, which in turn produce precise absorbance/fluorescence measurements. Example 1 is analogous to inserting a pipette tip into a mechanism and relying on the mechanism to create the necessary perpendicularity.

Specific reference to, for example, the above-discussed embodiments for the disclosed pipette tip, and the characteristics thereof, should not be interpreted to constrain the disclosed pipette tip to only those embodiments. The depicted and described embodiments are included for non-limiting illustration of the disclosed products for implementing systems, methods, techniques, processes and schemes for liquid sample observation, measurement and analysis, which should, therefore, be interpreted and as being exemplary only, and not limiting the disclosed schemes, in any manner.

Features and advantages of the disclosed embodiments are set forth in this disclosure and can be, at least in part, obvious from this detailed description, or can be learned by practice of the disclosed embodiments. The features and advantages of the disclosed embodiments can be realized and obtained by means of the instruments and combinations of features particularly described.

Various embodiments of the disclosed systems and methods are discussed in this disclosure. While specific implementations are discussed, this is done for illustration purposes only. A person skilled in the relevant art will recognize that other components and configurations can be used without departing from the spirit and scope of the disclosed embodiments.

The invention claimed is:

1. A device for photometric measurement of liquids comprising: an optically clear body having an outer wall and an inner wall, the inner wall defining an inner space for receiving a liquid sample; the inner space having a surface shape to provide a cross-sectional path for light, wherein a portion of the inner space is comprised of a plurality of optically clear tubes of differing inner diameter, each of the plurality of optically clear tubes providing a cross-sectional path of different lengths for light.

2. The device of claim 1 further comprising an at least one light source positioned to project light on the plurality of optically clear tubes.

3. The device of claim 1 further comprising an at least one light collector positioned to collect light on the plurality of optically clear tubes.

\* \* \* \* \*